United States Patent [19]

Ming-Tai

[11] Patent Number: 5,190,390
[45] Date of Patent: Mar. 2, 1993

[54] JOINT FOR CONNECTING A CANOPY SUPPORT TO A STROLLER

[76] Inventor: Huang Ming-Tai, 4th Fl., No. 302, Pailing Wu Rd., Taipei, Taiwan

[21] Appl. No.: 818,144
[22] Filed: Jan. 8, 1992
[51] Int. Cl.⁵ .............................................. F16B 1/00
[52] U.S. Cl. ...................... 403/24; 403/93; 403/97
[58] Field of Search .............. 403/93, 92, 94, 96, 403/84, 97, 24

[56] References Cited

U.S. PATENT DOCUMENTS

| | | | |
|---|---|---|---|
| 3,811,715 | 5/1974 | Brudy | 403/93 |
| 4,785,190 | 11/1988 | Frankena | 403/93 X |
| 4,880,331 | 11/1989 | Zun | 403/97 X |

*Primary Examiner*—Andrew V. Kundrat

[57] ABSTRACT

A joint for connecting a canopy support to a segment of a stroller structure. The joint has a first element and a second element. The first disk-shaped element has on a side thereof a cavity surrounded by a plurality of indents and on the other side thereof a channel matching with the segment of the stroller structure. A hole extends centrally through the first element. The second element has a pocket-shaped portion having a chamber surrounded by three walls and a wall formed with a window and a disk-shaped portion being integrated with the wall opposite to the wall with the window and formed with two slots beside the pocket-shaped portion. A hole extends through the second element. A flexible tab has a first end integrated with the canopy support and a second end diverged from the canopy support.

2 Claims, 6 Drawing Sheets

JOINT FOR CONNECTING A CANOPY SUPPORT TO A STROLLER

BACKGROUND OF THE INVENTION

The present invention relates to a joint for connecting a canopy support to a segment of a stroller structure and, more particularly, to a joint without a helical spring.

A conventional joint, referring to FIG. 6, has a first element having a circular cavity 61 surrounded by a wall formed with a plurality of identical teeth 62, a central hole 63, and a sleeve 64 for receiving a segment (not shown) of a stroller structure. Each tooth 62 is tapered at an outer end thereof. A second element 7 has a cup-shaped portion integrated with a sleeve 75 for receiving a canopy support (not shown). The cup-shaped portion defines a cavity 74 and a bottom. At the bottom of the cup-shaped portion, a circular plateau-shaped portion 71 is formed and surrounded by a wall formed with a plurality of identical teeth 72 corresponding to the teeth 62. A hole 73 extends centrally through the plateau-shaped portion 71. A helical spring 80 is received in the cavity 74. A cover 81 having a central hole is received in the cavity 74 so as to compress the spring 80. A rivet 82 is inserted through the hole of the cover 81, the spring 80, and holes 73 and 63, thereby combining the joint and connecting the canopy support to the stroller structure. Because of the wedge-like contact between the outer ends of the teeth 62 and the teeth 72, the teeth 72 can be disengaged from the teeth 62 when subject to a torque, thereby allowing the second element 7 to be rotated. When the torque is moved the helical spring 80 urges the teeth 72 to engage with the teeth 62 again. Such joint is structurally complicated. Therefore, the present invention is intended to obviate or mitigate, if not obviate, the above-mentioned problem.

SUMMARY OF THE INVENTION

The present invention provides a joint for connecting a canopy support to a segment of a stroller structure. The joint has a first element and a second element. The first disk-shaped element has a side thereof a cavity surrounded by a plurality of indents and on the other side thereof a channel matching with the segment of the stroller structure. A hole extends centrally through the first element. The second element has a pocket-shaped portion having a chamber surrounded by three walls and a wall formed with a window and a disk-shaped portion being integrated with the wall opposite to the wall with the window and formed with two slots beside the pocket-shaped portion. A hole extends through the second element. A flexible tab has a first end integrated with the canopy support and a second end diverged from the canopy support.

For a better understanding of the present invention and objects thereof, a study should be made to the detailed description of below-mentioned embodiments, in relation to the accompanying drawings.

DETAILED DESCRIPTION OF THE PREFERRED EMBODIMENT

This invention is to be understood by description of the preferred embodiments in accordance with the present invention.

Figure 5:
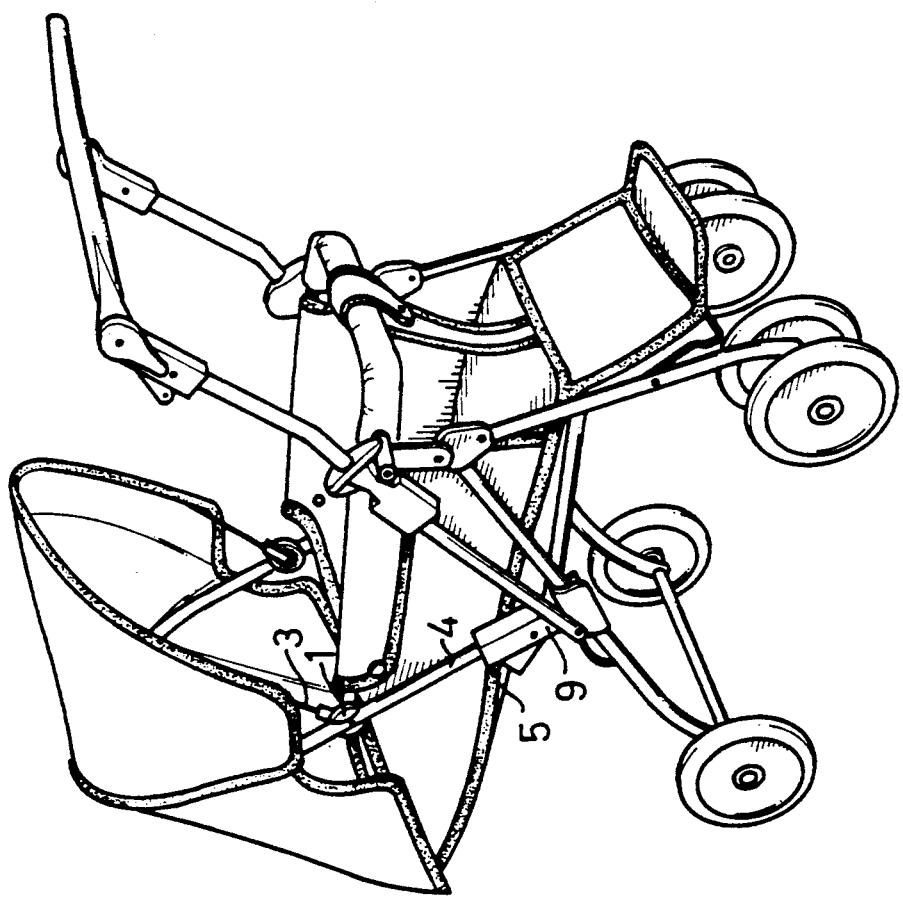
FIG. 5 is a perspective view of a stroller employing a joint in accordance with the present invention.
Figure 6:
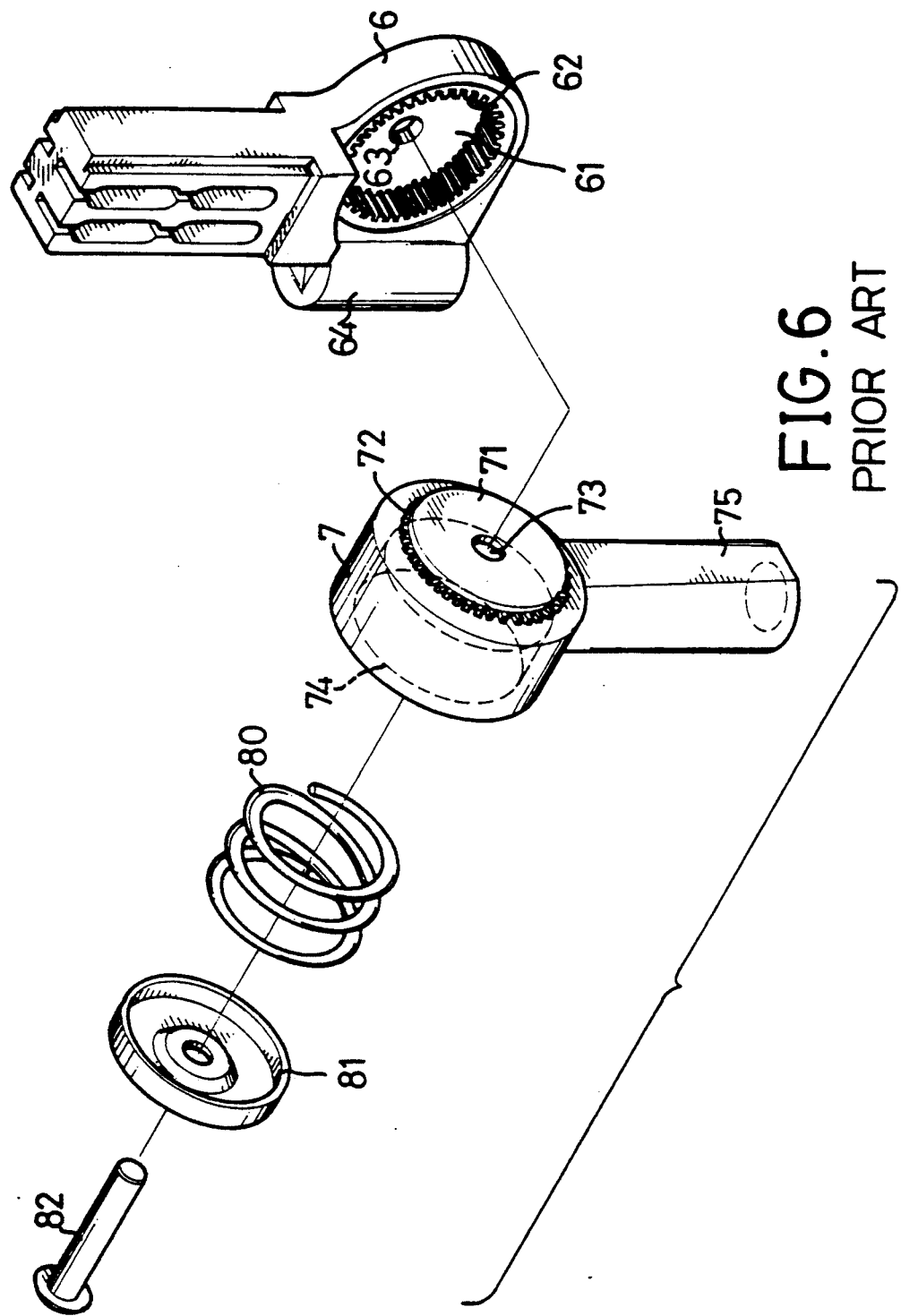
FIG. 6 is an exploded view of a joint in accordance with prior art.

Referring to the drawings and, more particularly, to FIG. 5, a joint according to a first embodiment of the present invention is employed to connect a canopy support 3 to a segment 4 of a stroller structure. A joint according to a second embodiment of the present invention is employed to connect the segment 4 of the stroller structure with another segment 5 of the stroller structure.

Figure 1:
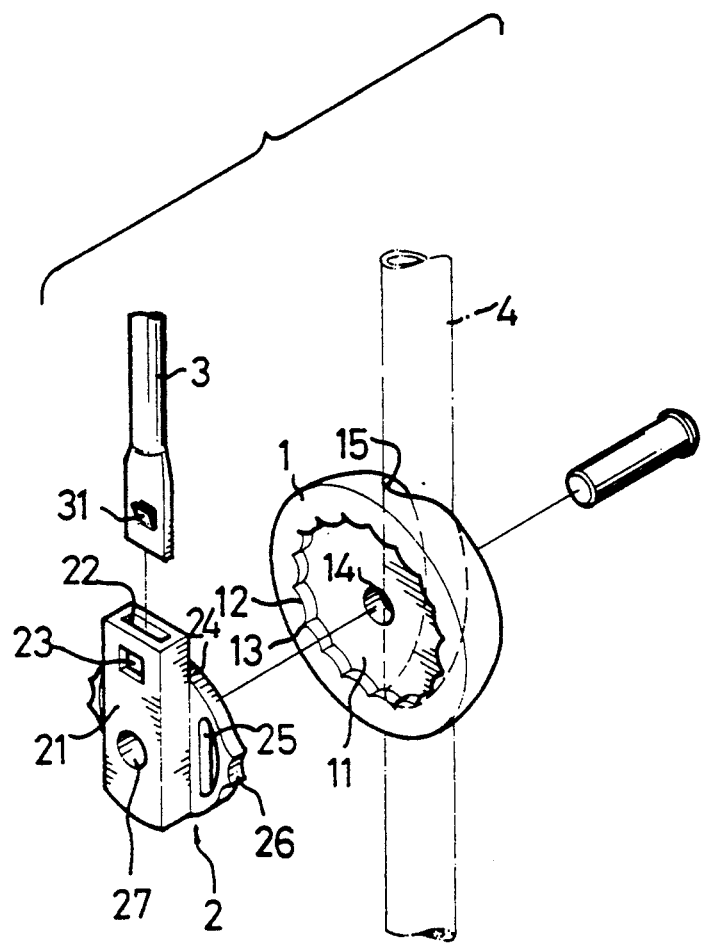
FIG. 1 is an exploded view of a joint in accordance with a first embodiment of the present invention.

Referring to FIG. 1, according to the first embodiment of the present invention, the joint has a first disk-shaped element 1 and second element 2. The first element has a cavity 11 on a side thereof, a channel 15 on the other side thereof, and a central hole 14 which extends therethrough perpendicular to the channel 15. The peripheral wall of the cavity 11 is formed with a plurality of indents 13. The channel 15 matches with the segment 4.

The element 2 has a pocket-shaped portion 21 defining a chamber 22 surrounded by four walls. One of the walls is formed with a window 23 communicating with the chamber 22. A disk-like portion 24 is integrated with the wall opposite to the wall formed with the window 23 and formed with two slots 25 beside the pocket-shaped portion 21 and a plurality of teeth 26 beside the slots 25, each corresponding to the indent 13. A hole 27 extends through the element 2 and, more specifically, through a center of the disk-like portion 24. A rivet is inserted through the holes 14 and 27 and a hole in the segment 4, thereby attaching the joint to the segment 4. A flexible tab 31 has a first end integrated with the canopy support 3 and a second end diverged from the canopy support 3. The canopy support 3 is received in the chamber 22 with the second end of the flexible tab 31 extending through the window 23, thereby firmly attaching the canopy support 3 to the joint. The second end of the flexible tab 31 can be compressed, thereby allowing the canopy support 3 to be disengaged from the element 2.

Figure 2:
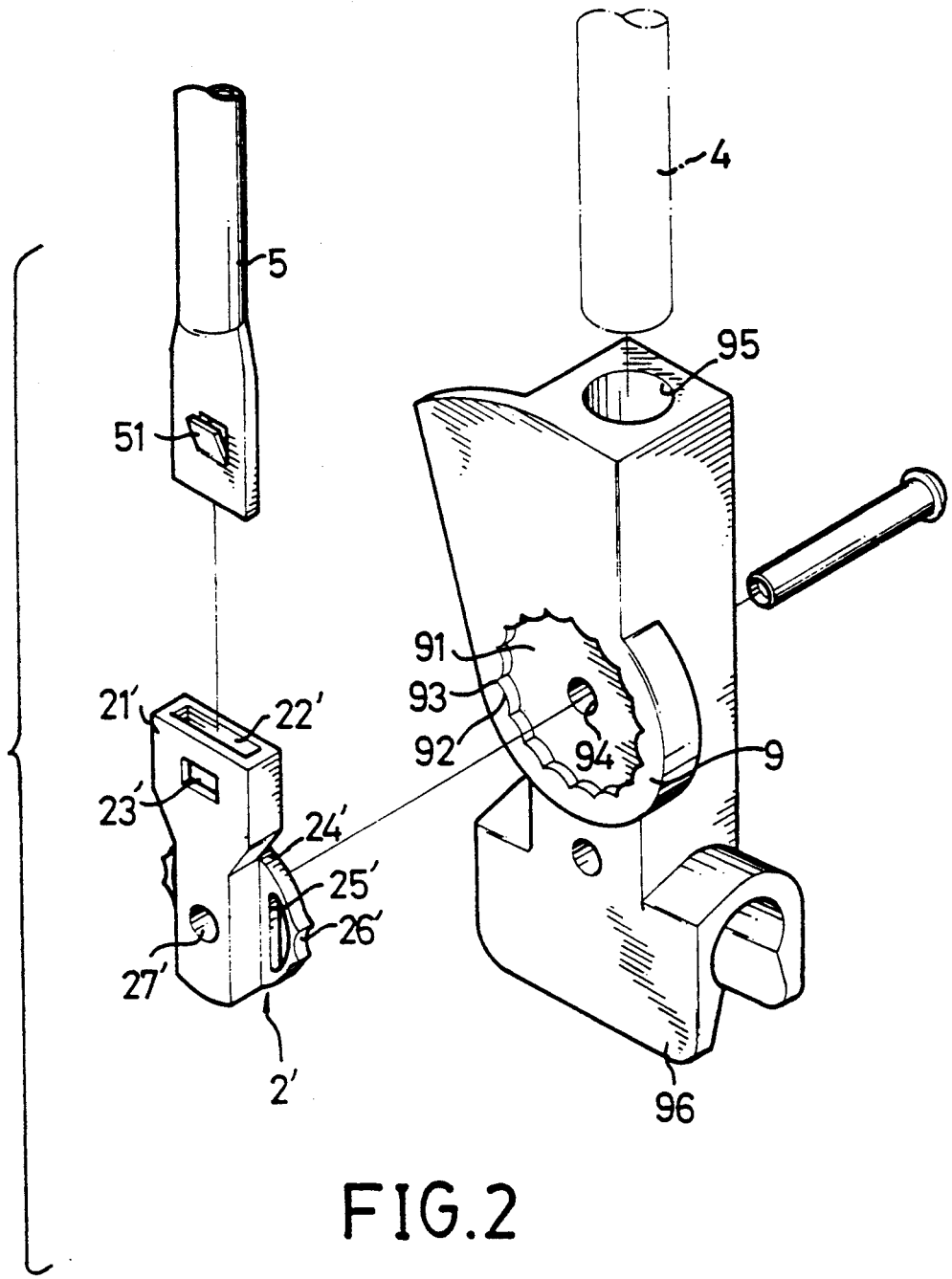
FIG. 2 is an exploded view of a joint in accordance with a second embodiment of the present invention.

Referring to FIG. 2, in accordance with a second embodiment of the present invention, a joint has an element 9, an element 2', and a flexible tab 51. Similar to the element 1, the element 9 has a cavity 91, a wall 92, a plurality of indents 93, and a hole 94. A tunnel 95 extends perpendicular to the hole 94 for receiving the segment 4 of the canopy support. A clamp 96 is integrated with and below the tunnel for receiving another segment (not shown) of the stroller structure. Similar to the element 2, the element 2' has a pocket-like portion 21', a chamber 22', a window 23', a disk-like portion 24', two slots 25', teeth 26', and a hole 27'. A rivet is inserted through the holes 94 and 27', thereby combining the elements 2' and 9 into the joint.

Figure 3:
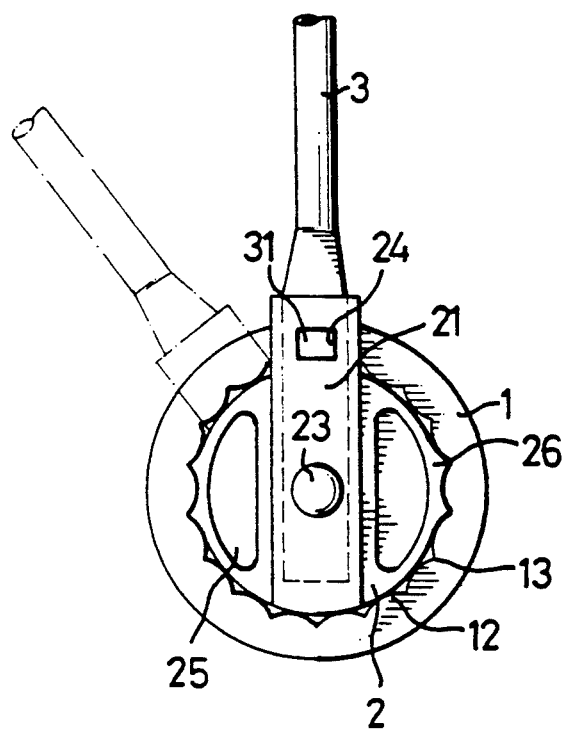
FIG. 3 is a front view of a joint in accordance with the present invention, showing the joint in a first fixed position and in a second fixed position.
Figure 4:
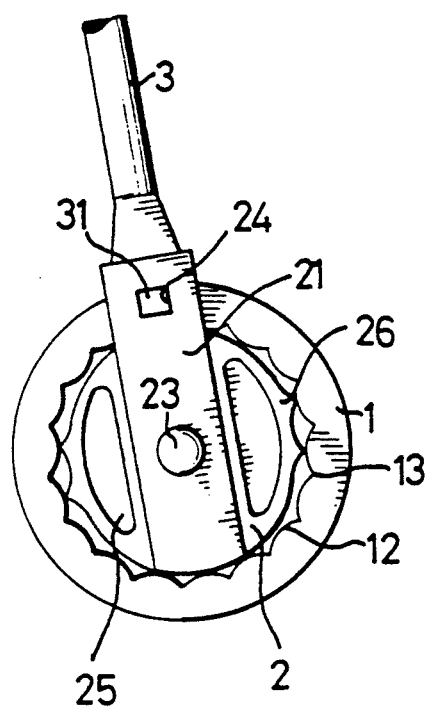
FIG. 4 is a front view of a joint in accordance with the present invention, showing the joint being switched from a first fixed position to a second fixed position.

Referring to FIGS. 3 and 4, the teeth 26 engage with the indents 13, thereby restraining the canopy support 3 in a fixed position. To be rotated, the canopy support 3 is subject to a transverse load, so that the element 2 is subject to a torque. Because of the wedge-like contact between the indents 13 and the teeth 26, the disk-shaped portion 24 is deformed because of the slots 25, thereby allowing the teeth 26 to be disengaged from the indents 13 so as to allow the canopy support 3 to be rotated. The canopy support 3 is moved to a second fixed position.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A joint comprising:
   (a) a first element having a first side attachable to a segment of an associated stroller structure and a second side formed with a generally circular cavity defined by a bottom wall and a side wall with a multiplicity of indents spaced thereabout, said element having a passage extending therethrough coaxially of said cavity;
   (b) a second element comprising:
      (i) a receptacle portion having a cavity extending thereinto from one edge thereof and an aperture in one side thereof communicating with said cavity;
      (ii) a disk-shaped portion on the side of said receptacle portion opposite that having said aperture and provides generally arcuate projections extending outwardly of said receptacle portion, each projection having a multiplicity of teeth formed on the periphery thereof and rotatably engageable with said indents of said first element; and
      (iii) passage extending from said one side of said receptacle portion and coaxially through said disk-shaped portion;
   (c) a pivot fastener extending through said passage of said first element and said passage of said second element to secure said first element and said second element in rotatable assembly; and
   (d) a canopy support having one end portion dimensioned and configured to seat in said cavity of said second element and having a resiliently deflectable tab on said end portion so that, when the canopy support is inserted into said cavity, said tab projects into and is hooked in said aperture, said flexible tab being deflectable to allow said end portion of said canopy support to be disengaged from said second element.

2. The joint in accordance with claim 1 wherein said arcuate projections have slots therein to provide resilient deflection the periphery of said arcuate projections to permit rotation of said teeth thereon about said detents.

* * * * *